(12) United States Patent
Atkins

(10) Patent No.: US 6,315,478 B1
(45) Date of Patent: Nov. 13, 2001

(54) HAND HELD GLASS WASHING APPARATUS

(76) Inventor: William B. Atkins, 400 N. Magnolia St., #6, Vidalia, LA (US) 71373

(*) Notice: Subject to any disclaimer, the term of this patent is extended or adjusted under 35 U.S.C. 154(b) by 0 days.

(21) Appl. No.: 09/536,771

(22) Filed: Mar. 28, 2000

Related U.S. Application Data

(60) Provisional application No. 60/127,024, filed on Mar. 31, 1999.

(51) Int. Cl.$^7$ ..................................................... A47L 13/26
(52) U.S. Cl. ............................. 401/37; 401/37; 401/139; 401/183; 401/272
(58) Field of Search ........................... 401/37, 139, 156, 401/183, 205, 270, 272, 280

(56) References Cited

U.S. PATENT DOCUMENTS

| | | | |
|---|---|---|---|
| D. 254,477 | * 3/1980 | Mack | D9/10 |
| 291,378 | 1/1884 | Miller . | |
| 749,486 | 1/1904 | Huddle . | |
| 1,952,476 | 3/1934 | Barlow | 15/126 |
| 1,952,477 | 3/1934 | Stich | 15/126 |
| 2,243,607 | 5/1941 | Rosen et al. | 15/124 |
| 2,587,382 | 2/1952 | Pyne | 15/136 |
| 2,707,292 | 5/1955 | Lustbader | 15/105 |
| 2,746,071 | 5/1956 | Charun | 15/123 |
| 2,886,839 | 5/1959 | Leopoldi | 15/126 |
| 3,052,910 | 9/1962 | Kushner | 15/531 |
| 5,547,303 | * 8/1996 | Pyrozyk | 401/270 |
| 5,908,256 | * 6/1999 | Bernstein | 401/205 |

* cited by examiner

*Primary Examiner*—David J. Walczak
*Assistant Examiner*—Peter deVore
(74) *Attorney, Agent, or Firm*—David L. Ray

(57) ABSTRACT

A glass cleaning device including a resilient hollow bottle having a hollow interior reservoir for containing and dispensing window cleaning fluid, the resilient hollow bottle having a squeegee wiper edge extending therefrom parallel to the longitudinal axis of the resilient hollow bottle, the bottle having a bottom end and a top end, the bottom end being closed and the top end being open to enable glass cleaning fluid to be dispensed therefrom, the top end of the bottle having a cap with an aperture therein for dispensing cleaning fluid therethrough and an array of bristles thereon for scrubbing the glass being cleaned, the cap being movable between a first position and a second position to selectively dispense cleaning fluid from the reservoir through the cap and into the bristles for cleaning the glass.

10 Claims, 6 Drawing Sheets

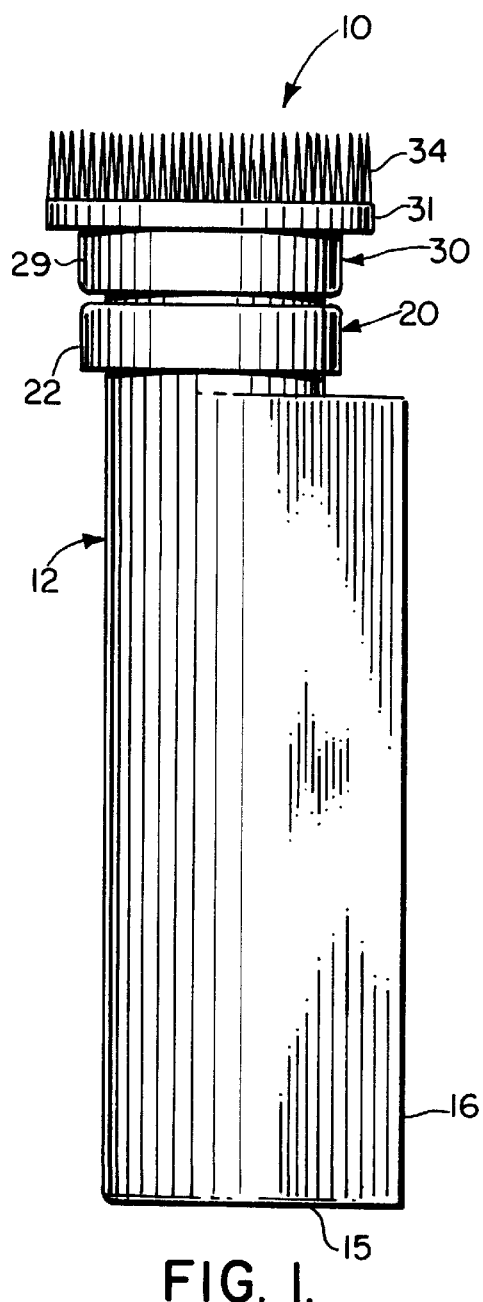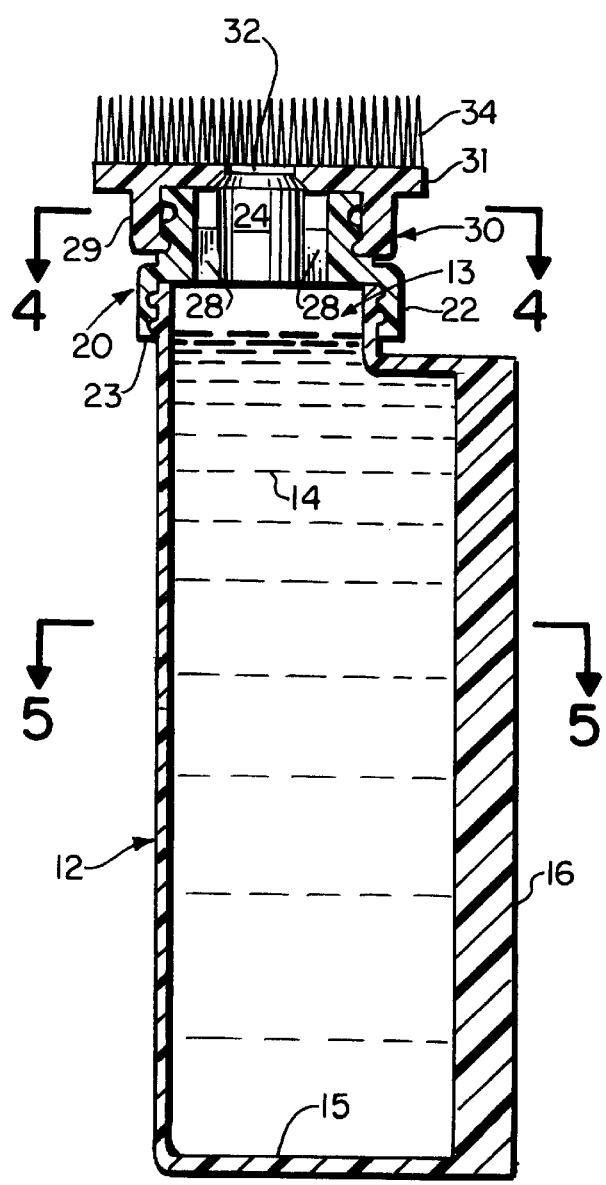
FIG. 1.
FIG. 2.

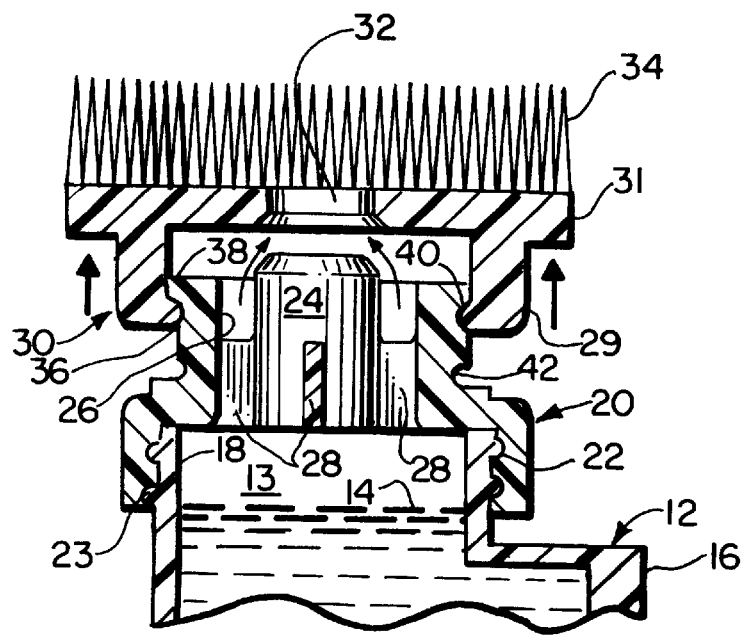
FIG. 3.
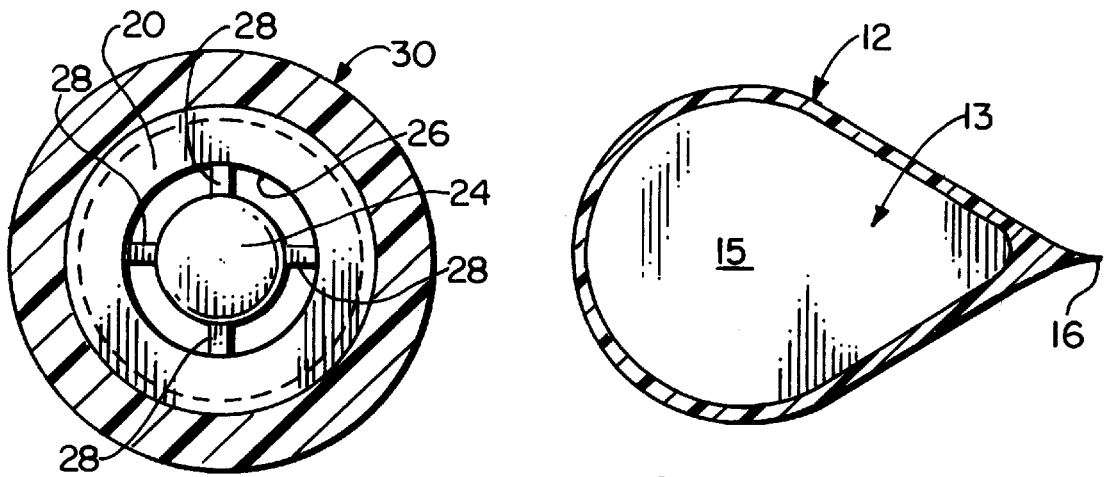
FIG. 4.
FIG. 5.

HAND HELD GLASS WASHING APPARATUS

CROSS-REFERENCE TO RELATED APPLICATIONS

This application claims the benefit of the filing date and priority of provisional application Ser. No. 60/127,024 filed Mar. 31, 1999, abandoned.

BACKGROUND OF THE INVENTION

1. Field of the Invention

The present invention relates to devices for cleaning glass. More particularly, the present invention relates to devices for cleaning glass items such as windshields and headlights.

2. Description of the Related Art

Devices for cleaning glass, including such glass items as windshields and headlights, are well known in the art. Exemplary of these devices are the following U.S. Pat. Nos. 3,052,910; 2,886,839; 2,746,071; 2,707,292; 2,587,382; 2,243,607; 1,952,477; 1,952,476; 749,486; and 291,378.

The object of the invention is to provide a windshield/headlight cleaning device which holds cleaning liquid, includes a scrubber and squeegee, and can be easily stored in an automobile glove compartment or map pocket or under the seat of an automobile.

Another object of the invention is to provide a cleaning device which is not complicated and therefore inexpensive to manufacture.

An additional object of the invention is to provide a cleaning device which is light weight and readily portable.

SUMMARY OF THE INVENTION

In accordance with the present invention there is provided a glass cleaning device including a resilient hollow bottle having a hollow interior reservoir for containing and dispensing window cleaning fluid, the resilient hollow bottle having a squeegee wiper edge extending therefrom parallel to the longitudinal axis of the resilient hollow bottle, the bottle having a bottom end and a top end, the bottom end being closed and the top end being open to enable glass cleaning fluid to be dispensed therefrom, the top end of the bottle having a cap with an aperture therein for dispensing cleaning fluid therethrough and an array of bristles thereon for scrubbing the glass being cleaned, the cap being movable between a first position and a second position to selectively dispense cleaning fluid from the reservoir through the cap and into the bristles for cleaning the glass.

When needed the user would grasp the bottle in one hand and with the other hand grasp the top rim of the cap and pull the cap up and away from the bottle, therefore opening the bottle to allow liquid to be released from the bottle. By squeezing the bottle the liquid is expelled on the surface which is desired to be cleaned. Once enough liquid is applied the user presses the bristles onto the surface of the glass to scrub the glass. The pressure applied in scrubbing will depress the cap in the closed position which prevents more liquid from escaping from the bottle. When the user has completed the scrubbing, the bottle is tilted until the squeegee edge of the bottle is horizontal to the surface, and the squeegee edge is then drawn across the surface to remove the fluid and loosened dirt.

BRIEF DESCRIPTION OF THE DRAWINGS

FIG. 1 is a elevational plan view of the hand held window washing apparatus of the invention;

FIG. 2 is a cross-sectional view of the hand held window washing apparatus of FIG. 1;

FIG. 3 is an enlarged view of the cap of the apparatus of the invention in the raised position;

FIG. 4 is a cross-sectional view taken along lines 4—4 of FIG. 2;

FIG. 5 is a cross-sectional view taken along lines 5—5 of FIG. 2;

DESCRIPTION OF THE PREFERRED EMBODIMENTS

Figure 6:
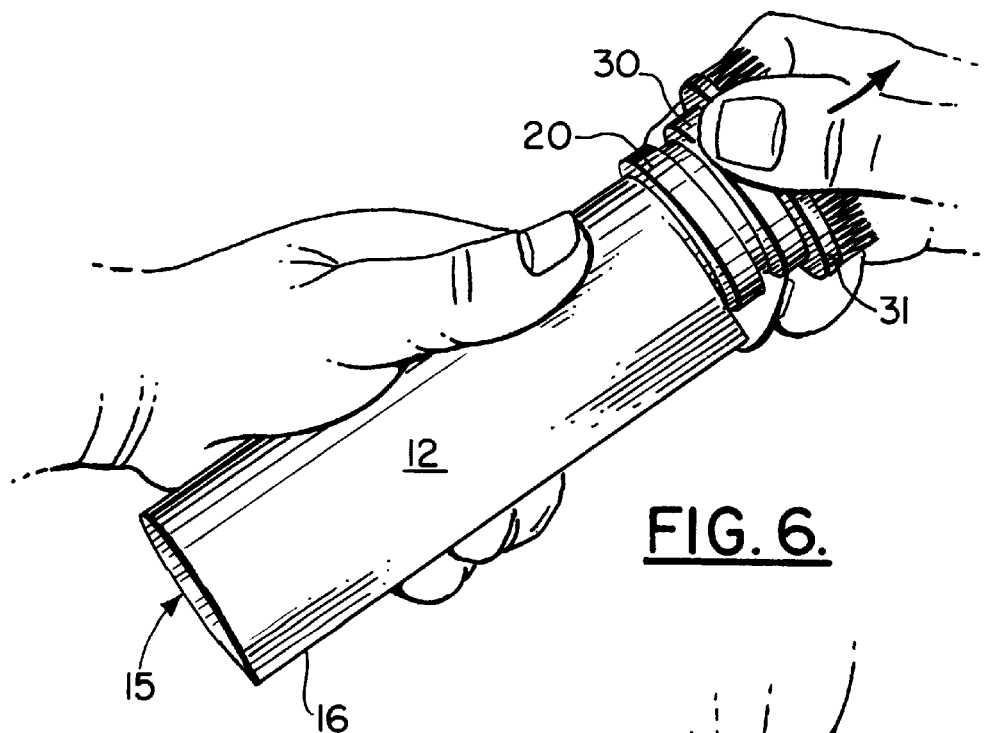
FIG. 6 is a perspective view showing the cap being pulled outwardly to the position shown in FIG. 3.

Referring now to the drawings, and in particular to FIG. 1, there is shown the hand-held window washing apparatus of the invention generally indicated by the numeral 10. The apparatus of the invention includes a bottle generally indicated by the numeral 12 which is hollow inside and generally tear-shaped in cross-section as shown in FIG. 5.

Bottle 12 preferably contains a liquid cleansing agent generally indicated by the numeral 14 contained in the reservoir 13 inside of bottle 12. Bottle 12 has a straight elongated edge 16 extending parallel to the longitudinal axis of bottle 12 which can be used as a squeegee as shown in FIG. 16 for wiping dirt and cleaning fluid from the glass being cleaned.

Bottle 12 has a planar bottom 15 and a threaded neck 18 on the top thereof on which is received a threaded fastener generally indicated by the numeral 20. As can best be seen in FIG. 3, fastener 20 has female threads 22 which receive the male threads 23 on the top 18 of bottle 12. Fastener 20 has a center sealing post generally indicated by the numeral 24 which is connected to the internal cylindrical opening 26 formed in the center of fastener 20 by ribs 28.

Slidably connected to the top of fastener 20 is a generally cylindrical cap 30 having an upper protruding lip 31 on the upper end thereof. Cap 30 has an aperture 32 therein in the center of lip 31 and a plurality of bristles 34 on the top surface of lip 31. Cap 30 has an inner ring 36 spaced apart from bristles 34 on the inside of cylindrical wall 29 of cap 30 extending completely therearound which is received on a circular protuberance 38 which extends around the outside of the periphery of generally cylindrical fastener 20. Fastener 20 has two spaced apart circular grooves 40 and 42 shown in FIG. 3 which extend completely therearound for receipt of inner ring 36.

As can be seen in FIGS. 2 and 3, cap 30 can be moved upwardly by grasping with the hands and pulling upwardly as shown by the arrow in FIG. 6 to force cap 30 from the first, sealed position shown in FIG. 2 to the second, open position shown in FIG. 3. As can be seen in FIG. 3, inner ring 36 is received in groove 40 of fastener 20 when in the position shown in FIG. 3, and received in groove 42 of fastener 20 when in the position shown in FIG. 2.

When cap 30 is in the position shown in FIG. 2, a seal is formed between aperture 32 and sealing post 24 to prevent liquids 14 from leaking from bottle 12. When cap 30 is in the position as shown in FIG. 3, liquids can flow around sealing post 24 as indicated by the arrows in FIG. 3 and outwardly through the aperture 32 to the bristles 34 on top of cap 30.

Figure 7:
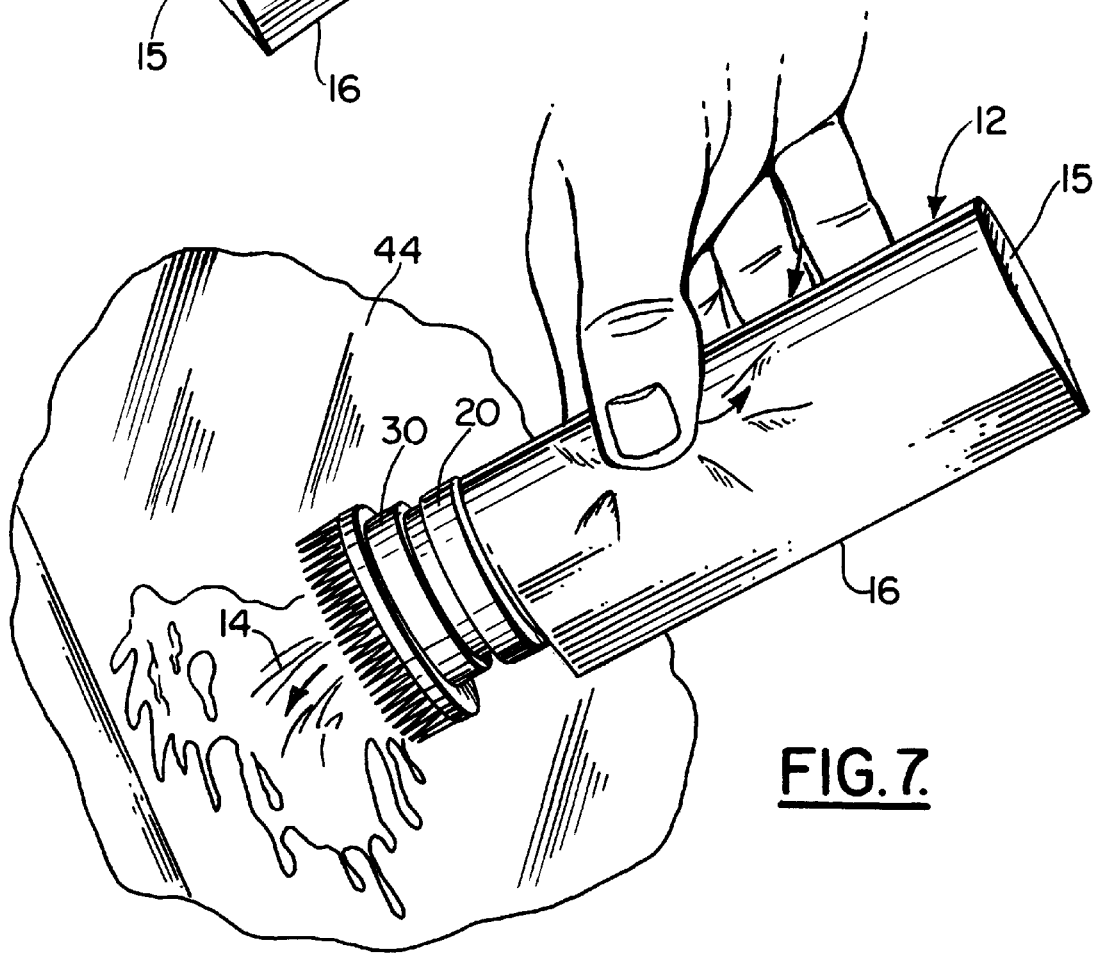
FIG. 7 is a perspective view showing squeezing of the bottle of the apparatus of the invention to dispense cleanser upon a piece of glass such as windshield.

To utilize the apparatus of the invention, the cap 30 is pulled outwardly as shown in FIG. 6. As shown in FIG. 7, the cap 30 and bristles 34 are oriented adjacent to a glass such as a windshield 44 shown in FIG. 7 and bottle 12 is squeezed by forcing the thumb of the user toward the fingers of the user as shown by the arrows in FIG. 7. Liquid 14 is thereby forced onto the surface of the windshield 44 as indicated in FIG. 7 due to the squeezing of the bottle. Preferably, bottle 12, cap 30, and fastener 20 are made from a resilient polymeric or plastic material such as polyethylene or the like which enables the bottle 12 to flex inwardly when bottle 12 is squeezed by the thumb and fingers of the user as shown in FIG. 7 and cap 30 to slide upward and downward on fastener 20 as explained above.

Figure 8:
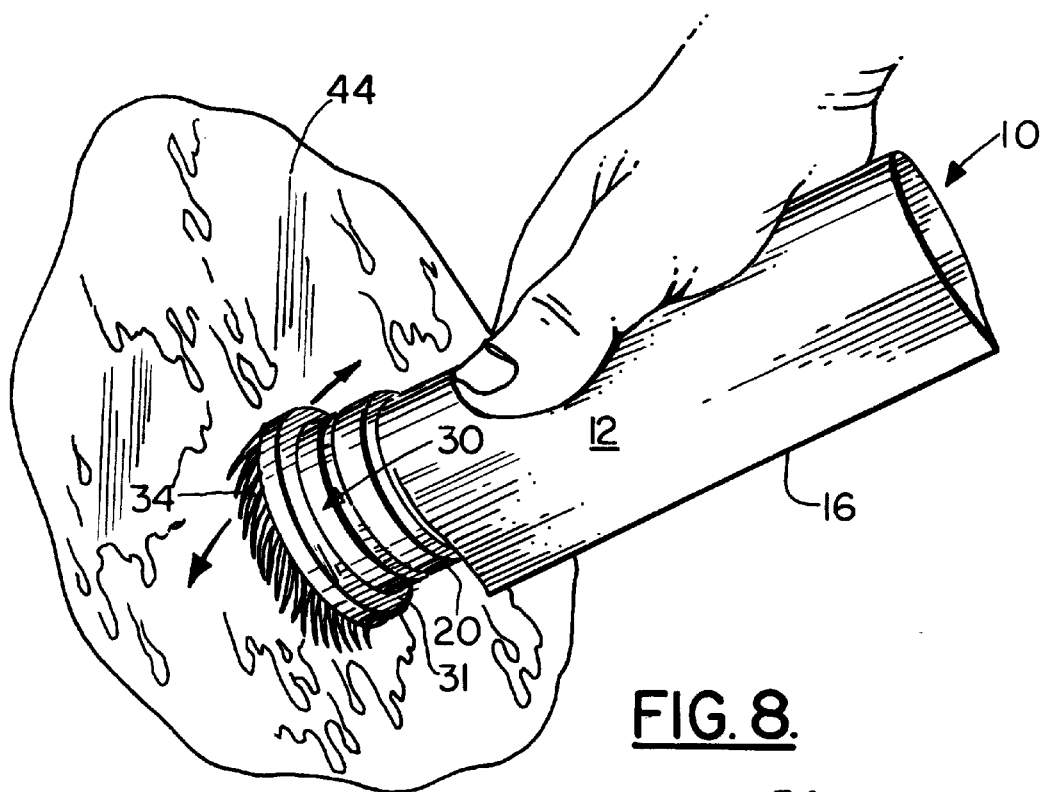
FIG. 8 is a perspective view of the apparatus of the invention being grasped by the user and moved over the surface of the glass to scrub dirt therefrom.

As shown in FIG. 8 the apparatus of the invention can then be forced against the windshield as shown in FIG. 8 to move the cap 30 from the position shown in FIG. 3 to the position shown in FIG. 2 to prevent liquids from being dispensed therefrom. Then, as shown in FIG. 8, the bristles 34 are moved across the windshield 44 back and forth as indicated by the arrows in FIG. 8 to scrub dirt and other particles therefrom.

Figure 9:
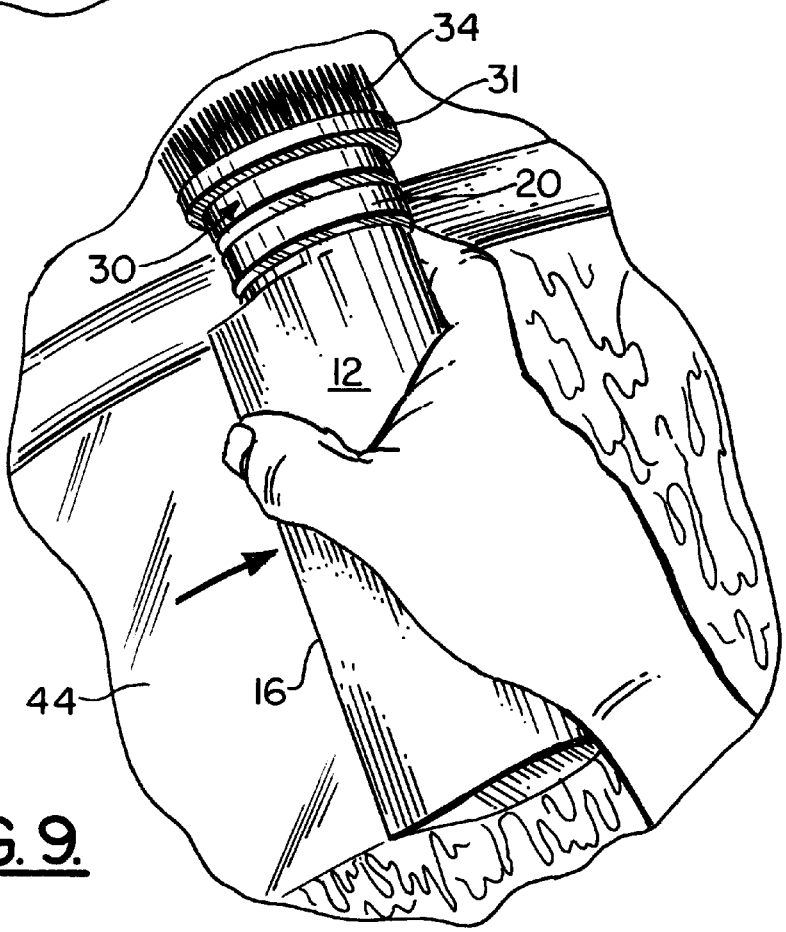
FIG. 9 is a perspective view of the apparatus of the invention showing the squeegee portion of the bottle being moved across the surface of the glass in the direction indicated by the arrow to remove cleanser and dirt therefrom.

After the windshield is scrubbed with the bristles 34, the apparatus 10 is oriented over the windshield as shown in FIG. 9 to contact the windshield with the squeegee edge 16 of the apparatus 10 of the invention. The squeegee edge 16 is moved across the glass windshield as shown in FIG. 9 to remove cleaning liquid and dirt therefrom in the manner of a conventional squeegee.

Figure 10:
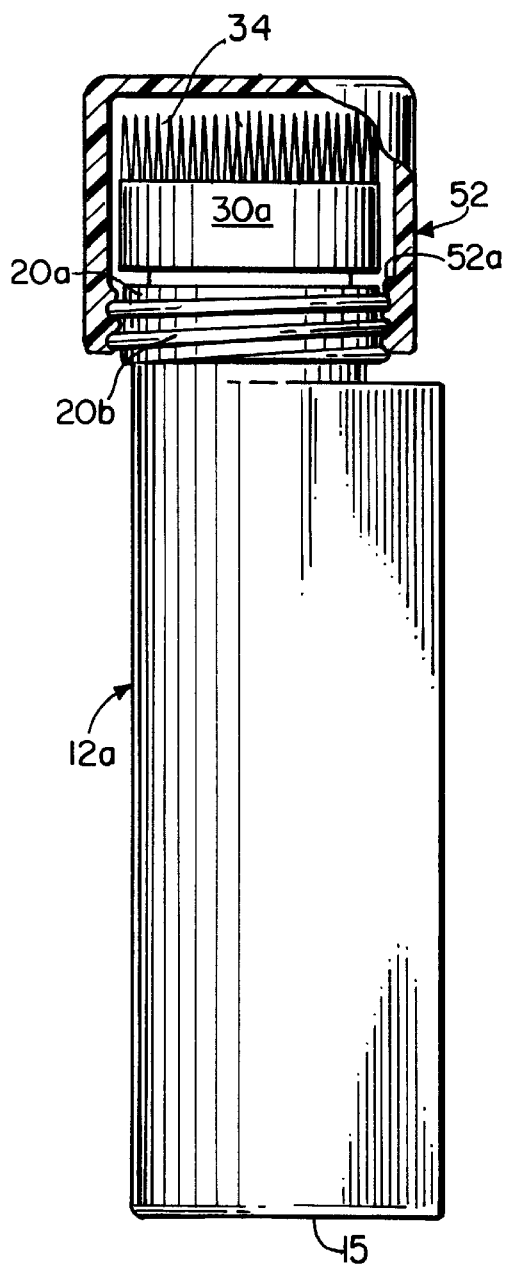
FIG. 10 is a perspective view, partly cut-away, of a second embodiment of the invention.

A second embodiment of the invention is shown in FIG. 10. The second embodiment of the invention shown in FIG. 10 has a bottle 12a which is identical to bottle 12 described above, a fastener 20a which is identical to fastener 20 described above except that fastener 20a has male threads 20b on the outer surface thereof, and cap 30a which is identical to cap 30 described above except that upper lip 31 is deleted. A cylindrical cover 52 is shown in FIG. 10 to be placed over cap 30a. Cover 52 has internal female threads 52a which are received by male threads 20b on fastener 20a to selectively connect cover 52 to male threads 20b.

Figure 11:
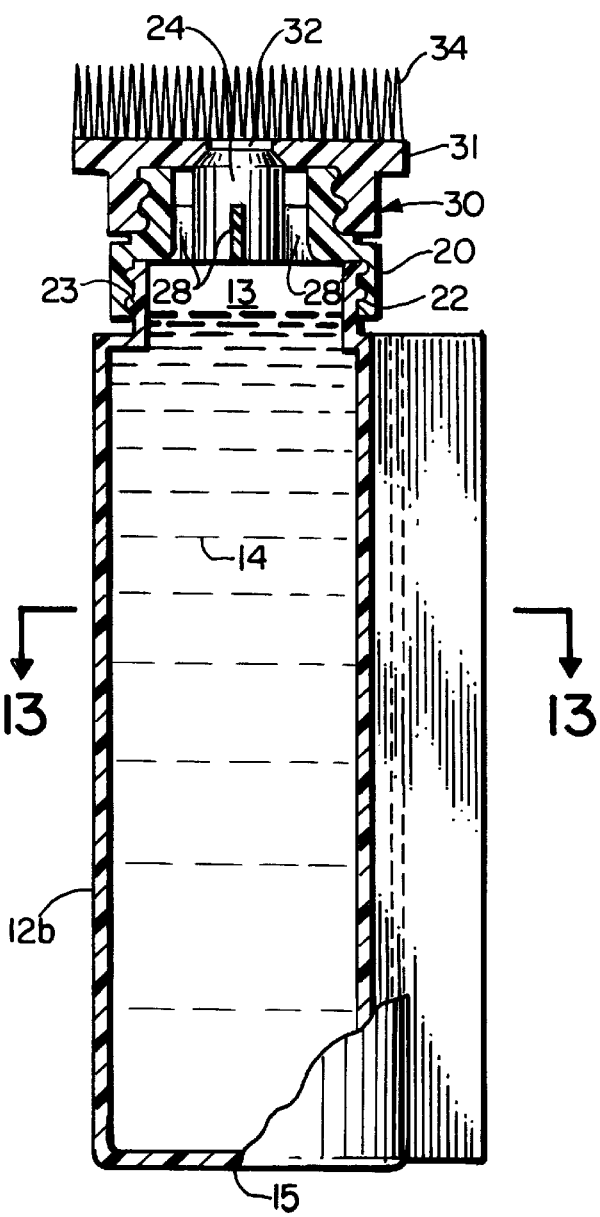
FIG. 11 is a perspective view, partly cut-away, of a third embodiment of the invention.
Figure 13:
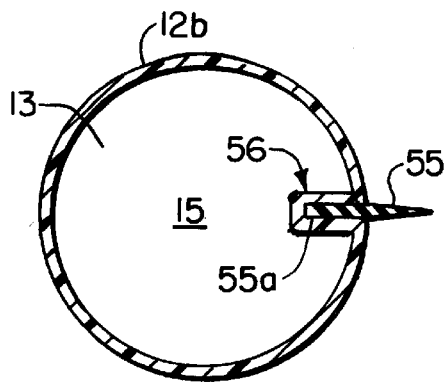
FIG. 13 is a cross-sectional view taken along lines 13—13 of FIG. 11.

A third embodiment of the invention is shown in FIGS. 11 and 13 and can be seen to have a fastener 20 and cap 30 which have been described above. The third embodiment of the invention has a bottle 12b which is identical to bottle 12 except the bottle 12b is cylindrical in cross-section as shown in FIG. 13 and has a flexible squeegee 55 held in a slot 55a in a squeegee holder generally indicated by the numeral 56 in FIG. 13 located on the inside of bottle 12b having a slot 55a therein. Squeegee 55 may be held in slot 55a by gluing, force-fitting, or the like.

Figure 12:
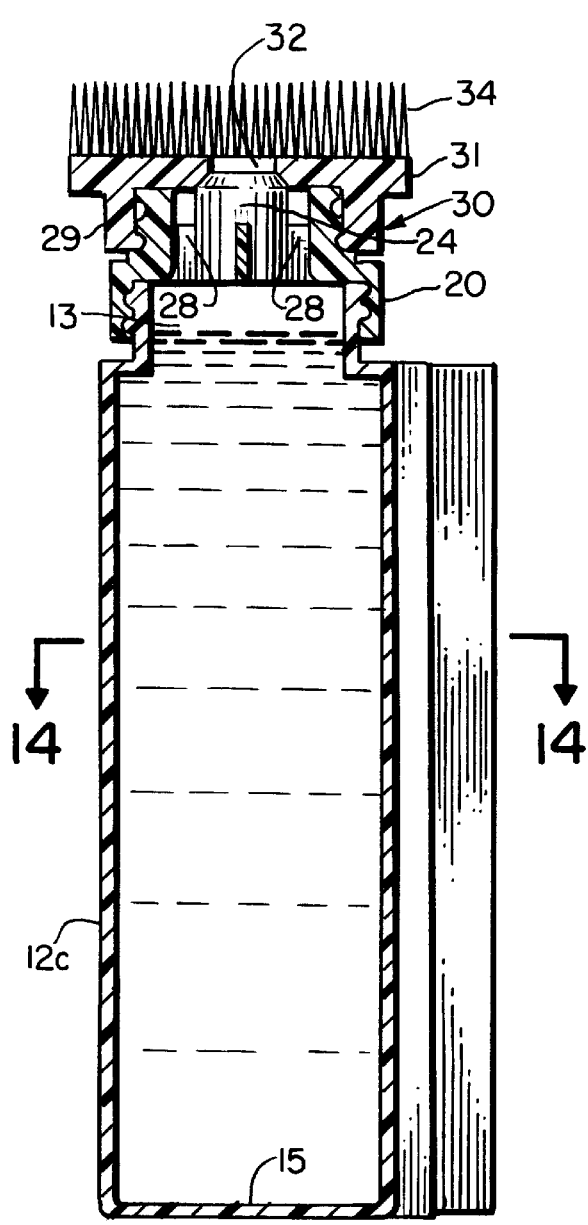
FIG. 12 is a perspective view, partly cut-away, of a fourth embodiment of the invention.
Figure 14:
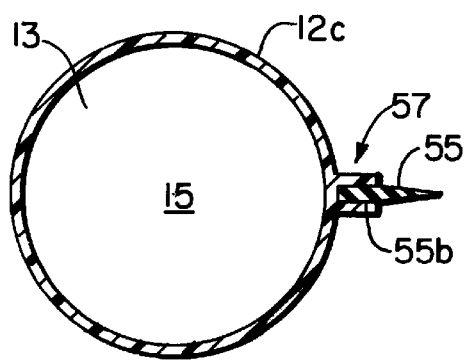
FIG. 14 is a cross-sectional view taken along lines 14—14 of FIG. 12.

A fourth embodiment of the invention is shown in FIGS. 12 and 14 and can be seen to have a fastener 20 and cap 30 which have been described above. The third embodiment of the invention has a bottle 12c which is identical to bottle 12 except the bottle 12c is cylindrical in cross-section as shown in FIG. 14 and has a flexible squeegee 55 held in a slot 55b in a squeegee holder generally indicated by the numeral 57 in FIG. 14 located on the outside of bottle 12c. Squeegee 55 may be held in slot 55b by gluing, force-fitting, or the like.

The second, third and fourth embodiments of the invention are utilized in the same manner as described above for the first embodiment of the invention.

Although the preferred embodiments of the invention have been described in detail above, it should be understood that the invention is in no sense limited thereby.

What is claimed is:

1. A glass cleaning device comprising a resilient hollow bottle having a hollow interior reservoir for containing and dispensing window cleaning fluid, said resilient hollow bottle having a squeegee wiper edge extending therefrom parallel to the longitudinal axis of said resilient hollow bottle, said resilient hollow bottle having a bottom end and a top end, said bottom end being closed to contain glass cleaning fluid therein and said top end being open to enable glass cleaning fluid to be dispensed therefrom, said top end of said resilient hollow bottle having a generally cylindrical cap with an aperture therein for dispensing cleaning fluid therethrough and an array of bristles thereon for scrubbing glass being cleaned, said cap being movable between a first position and a second position to selectively dispense cleaning fluid from said reservoir through said aperture in said cap and into said bristles for cleaning glass, said resilient hollow bottle having a threaded hollow neck on the upper end thereof which communicates with said reservoir in said resilient hollow bottle, a hollow threaded fastener assembly connected to said threaded neck, said cap being connected to said fastener, said fastener having a top end and a bottom end, said bottom end having threads thereon for connection to said threaded neck, said top end of said fastener having two parallel, spaced apart circular grooves extending completely around the outside thereof, said cap having an inner ring which is selectively received in each of said two parallel, spaced apart grooves to selectively force said aperture of said cap against said sealing post to prevent cleaning fluids in said reservoir from flowing through said aperture, and to space said aperture away from said sealing post to enable cleaning fluids from said reservoir to flow through said aperture.

2. The glass cleaning device of claim 1 wherein said cap seals said cleaning fluid in said resilient hollow bottle when in said first position, and enables said cleaning fluid to be dispensed through said aperture onto said bristles from said resilient hollow bottle when in said second position.

3. The glass cleaning device of claim 2 wherein said resilient hollow bottle has a tear-shaped cross-section.

4. The glass cleaning device of claim 3 wherein said squeegee edge is formed integrally with said bottle.

5. The glass cleaning device of claim 1 wherein said hollow threaded fastener has a central sealing post therein for selectively forming a seal with said cap.

6. The glass cleaning device of claim 5 wherein said central sealing post is located in the center of said fastener and is connected thereto by a plurality of ribs.

7. A glass cleaning device comprising a resilient hollow bottle means having a hollow interior reservoir means for containing and dispensing window cleaning fluid, said resilient hollow bottle means having a squeegee wiper edge extending therefrom parallel to the longitudinal axis of said resilient hollow bottle means, said resilient hollow bottle means having a bottom end and a top end, said bottom end being closed to contain glass cleaning fluid therein and said top end being open to enable glass cleaning fluid to be dispensed therefrom, said top end of said resilient hollow bottle means having a generally cylindrical cap means with an aperture therein for dispensing cleaning fluid therethrough and an array of bristles thereon for scrubbing glass being cleaned, said cap means being movable between a first position and a second position to selectively dispense cleaning fluid from said reservoir means through said aperture in said cap means and into said bristles for cleaning glass, said resilient hollow bottle means having a threaded hollow neck on the upper end thereof which communicates with said reservoir means in said resilient hollow bottle means, a hollow threaded fastener assembly connected to said threaded neck, said cap means being connected to said fastener, said fastener having a top end and a bottom end, said bottom end having threads thereon for connection to said threaded neck, said top end of said fastener having two parallel, spaced apart circular grooves extending completely around the outside thereof, said cap having an inner ring which is selectively received in each of said two parallel, spaced apart grooves to selectively force said aperture of said cap means against said sealing post to prevent cleaning fluids in said reservoir means from flowing through said aperture, and to space said aperture away from said sealing post to enable cleaning fluids from said reservoir means to flow through said aperture.

8. The glass cleaning device of claim 7 wherein said cap means seals said cleaning fluid in said bottle means when in said first position, and enables said cleaning fluid to be dispensed through said aperture onto said bristle means from said resilient hollow bottle means when in said second position.

9. The glass cleaning device of claim 8 wherein said resilient hollow bottle means has a tear-shaped cross-section.

10. The glass cleaning device of claim 8 wherein said squeegee edge is formed integrally with said resilient hollow bottle means.

* * * * *